United States Patent

Chawla

[11] Patent Number: 5,696,179
[45] Date of Patent: Dec. 9, 1997

[54] SILANE OLIGOMER AND RADIATION CURABLE COATING COMPOSITION CONTAINING THE OLIGOMER

[75] Inventor: Chander P. Chawla, Batavia, Ill.

[73] Assignee: DSM, N.V., Te Heerlen, Netherlands

[21] Appl. No.: 354,835

[22] Filed: Dec. 8, 1994

Related U.S. Application Data

[63] Continuation-in-part of Ser. No. 326,127, Oct. 19, 1994, abandoned.

[51] Int. Cl.$^6$ ............................ C08F 2/50; C08L 75/16; C08L 75/02; C08L 75/04
[52] U.S. Cl. ........................ 522/90; 522/96; 522/97; 522/172; 528/25; 528/27; 528/28; 528/32; 528/40
[58] Field of Search .................. 522/148, 172, 522/174, 90, 170, 96, 97; 528/25, 28, 27, 32, 40

[56] References Cited

U.S. PATENT DOCUMENTS

| | | | |
|---|---|---|---|
| 4,542,065 | 9/1985 | Gaa | 428/391 |
| 4,849,462 | 7/1989 | Bishop | 522/97 |
| 5,146,531 | 9/1992 | Shustack | 385/128 |
| 5,233,006 | 8/1993 | Wolter et al. | 528/32 |
| 5,426,132 | 6/1995 | Gaglani | 522/148 |

FOREIGN PATENT DOCUMENTS

| | | |
|---|---|---|
| 0158893 | 10/1985 | European Pat. Off. . |
| 0243802 | 11/1987 | European Pat. Off. . |
| 0529895 | 3/1993 | European Pat. Off. . |

OTHER PUBLICATIONS

Chemical Abstracts, vol. 108, No. 20, May 16, 1988, Columbus, Ohio, Abstract No. 168573m, p. 42.
Chemical Abstracts, vol. 102, No. 26, Jul., 1985, Columbus, Ohio, Abstract No. 222276h, p. 83.

*Primary Examiner*—Susan W. Berman
*Attorney, Agent, or Firm*—Cushman Darby & Cushman, IP Group of Pillsbury Madison & Sutro LLP

[57] ABSTRACT

The invention provides a silane-oligomer (A) of the following formula:

$$(R^3)-X-(R^1_x)-Y-Si(R^2)_3 \qquad (1)$$

wherein $R^3$ is a group having a functionality that can be polymerized through actinic radiation, $R^1_x$ is a backbone-oligomer having a molecular weight of more than about 200, $R^2$ is a hydrolyzable group, and X and Y are coupling groups. The invention also provides a glass coating composition containing the silane-oligomer.

25 Claims, No Drawings

SILANE OLIGOMER AND RADIATION CURABLE COATING COMPOSITION CONTAINING THE OLIGOMER

This application is a Continuation-in-Part of application Ser. No. 08/326,127, filed on Oct. 19, 1994, now abandoned.

BACKGROUND OF THE INVENTION

1. Field of the Invention

This invention relates to a reactive oligomer containing a functional group that can be polymerized using actinic radiation and a silane group, and to a radiation curable coating composition for a glass substrate comprising the reactive oligomer.

2. Description of Related Art

It has long been known that glass substrates are weakened upon exposure to water. For example, moisture in air can cause weakening and the eventual breakage of glass.

Typically, glass substrates have been coated with polymeric compositions for various reasons, such as to protect and preserve the strength of a glass object, to prevent damage during handling, and to prevent moisture from attacking the glass substrate. For optical glass fibers, in addition, polymeric coatings have been applied to the fiber to decrease possible microbending. Microbending can reduce the transmission of electromagnetic radiation through the fiber and is therefore undesirable. However, many conventional coating compositions are water permeable and therefore not effective in protecting the glass substrate from moisture.

In addition to causing the weakening of glass substrates, moisture can also cause polymeric compositions that have been applied to the glass substrate to delaminate from the glass surface. The delamination of a polymeric composition can result in a weakened glass substrate, because the polymeric coating no longer protects the glass from environmental attack.

To avoid moisture damage to the glass surface as much as possible, it is desirable to provide a coating composition having low water absorption, low loss of coating-adhesion to glass, and a low water soak extraction.

A coating composition for optical glass fibers must also have sufficient adhesion to the glass fiber and yet be strippable.

Various coating compositions have been used to prevent the deterioration of glass substrates, specifically optical fibers, and to improve the useful life of the glass substrate. U.S. Pat. No. 4,849,462 describes a coating composition comprising a U.V.-curable polyurethane polyacrylate containing about 0.5 to 5.0% by weight of a polyalkoxysilane containing a mercaptogroup.

U.S. Pat. No. 5,146,531 describes an inner primary coating that contains an acrylated urethane oligomer based on a hydrocarbonpolyol, several reactive diluents, an organofunctional adhesion promotor, and a photoinitiator.

For certain applications, conventional coating compositions do not have the required combination of sufficient adhesion to glass and strippability, resistance to water absorption, and a low water soak extraction.

SUMMARY OF THE INVENTION

It is an object of the invention to provide coating compositions having an improved combination of properties including a sufficient adhesion to glass and yet be strippable, resistance to water absorption, and a low water soak extraction.

The above objects and other objects are obtained by providing a coating composition comprising the following oligomer:

$$(R^3)-X-(R^1{}_x)-Y-Si(R^2)_3 \qquad (1)$$

wherein $(R^3)$ is a group comprising a functionality that can be polymerized through actinic irradiation, $(R^1{}_x)$ is a backbone-oligomer having a molecular weight of more than about 200, $R^2$ is a hydrolyzable group, and X and Y are coupling groups. This oligomer is hereinafter designated as the "silane-oligomer."

Preferably, the silane-oligomer is a urethane oligomer which is obtained by the reaction of (i) an oligomer diol, (ii) a polyisocyanate, (iii) a compound providing a reactive terminus and (iv) a silane containing compound.

When used in coating compositions, the silane-oligomer provides good wet adhesion to glass and low water soak extractability. Reduced water absorption can be provided by choosing a non-polar backbone-oligomer.

The invention also relates to a silane-oligomer (A) of the following formula:

$$(R^3)-X-(R^1{}_x)-Y-Si(R^2)_3 \qquad (1)$$

wherein $R^3$ is a group comprising a functionality that can be polymerized through actinic radiation, $R^1{}_x$ is a backbone-oligomer having a molecular weight of more than about 200, $R^2$ is a hydrolyzable group, and X and Y are coupling groups.

The invention further relates to a method of making a silane-oligomer (A) of the following formula:

$$(R^3)-X-(R^1{}_x)-Y-Si(R^2)_3 \qquad (1)$$

wherein $R^3$ is a group comprising a functionality that can be polymerized through actinic radiation, $R^1{}_x$ is a backbone-oligomer having a molecular weight of more than about 200, $R^2$ is a hydrolyzable group, and X and Y are coupling groups, the method comprising the steps of, reacting a polyisocyanate, a compound providing a reactive terminus, an oligomer diol, and a silane compound.

The invention also relates to an oligomer mixture comprising a substantial amount of a radiation curable ethylenically unsaturated oligomer having a silane group, said mixture being obtainable by the reaction of a polyisocyanate, a compound providing a reactive terminus, an oligomer diol, and a silane compound.

The invention further relates to optical fibers coated with these coating compositions.

DESCRIPTION OF THE INVENTION

The silane-oligomer has the formula:

$$(R^3)-X-(R^1{}_x)-Y-Si(R^2)_3 \qquad (1)$$

wherein $(R^3)$ is a group comprising a functionality that can be polymerized through actinic radiation, $(R^1{}_x)$ is backbone-oligomer with a molecular weight of more than about 200, $R^2$ is a hydrolyzable group, and X and Y are coupling groups.

The group $(R^3)$ comprising a functionality that can be polymerized through actinic radiation, can be any group capable of polymerizing under the influence of, for example, ultraviolet or electron-beam radiation. One type of functionality is, for example, an ethylenic unsaturation, which in general is polymerized through radical polymerization, but can also be polymerized through cationic polymerization. Examples of ethylenic unsaturation are groups containing acrylate, vinylether, methacrylate or acrylamide functionality. Another type of functionality is provided by, for example, epoxy groups, or thiol-ene or amine-ene systems. Epoxy groups, in general, can be polymerized through cationic polymerization, whereas the thiol-ene and amine-ene systems are polymerized through radical polymerization. The epoxy groups can be, for example, homoplymerized. In the thiol-ene and amine-ene systems, for example, polymerization can occur between a group containing allylic unsaturation a group containing a tertiary amine or thiol. Preferably, the group ($R^3$) is an acrylate group, a methacrylate group, or a vinylether group. Most preferably, the ($R^3$) group is an acrylate group.

The group $R^1{}_x$, the backbone oligomer with a molecular weight of more than about 200, can be, for example, based on a polyether, polyolefin, polyester, polycarbonate, or copolymers thereof. The molecular weight of the backbone oligomer is preferably higher than 250, more preferably higher than 400, and most preferably higher than 600. The molecular weight is preferably less than about 10,000, and more preferably less than 5,000. Molecular weight, as used throughout this application, is the calculated molecular weight of the molecule concerned. In the case of a polymer structure, it is the calculated molecular weight of the expected structure based on the starting materials and reaction conditions. The molecular weight can also be determined using conventional techniques.

The backbone oligomer can comprise one or more polymer blocks coupled with each other via, for example, polyisocyanates.

Preferably, the backbone-oligomer is a polyether, a polyolefin, or a copolymer thereof. If the backbone-oligomer is a polyether, the resulting coatings have a low glass transition temperature and good mechanical properties. If the backbone-oligomer is a polyolefin, the resulting coatings have a further improved water resistance.

The hydrolyzable group $R^2$ is the same or different for each group bound to Si in formula (1). Preferably, all $R^2$ groups are the same. Preferably, $R^2$ is an alkoxy, carboxy, or alkoxyether group. More preferably, $R^2$ is an alkoxy or alkoxy-ether group. $R^2$ is preferably a low molecular weight compound having less than 8 carbon atoms, and more preferably having less than 4 carbon atoms. Examples of hydrolyzable groups $R^2$ are methoxy, ethoxy, acetoxy or β-methoxy-ethoxy.

The groups X or Y can be the same or different and can be any group able to provide a link between the (R3)-group or the silane and the backbone-oligomer $R^1$. Examples of X and Y are urethane, urea, carbonate, ether, thio-urethane and ester groups. Urethane, urea and thiourethane groups are preferred.

The groups X and Y (independently), can each comprise one or more groups that provide for the linkage. Preferably, the groups X and Y each comprise one or two groups that provide for the linkage.

The silane oligomer according to formula (1) preferably has a molecular weight higher than about 500, more preferably higher than 1,000, and most preferably higher than 1,500. The molecular weight is preferably lower than about 11,000, more preferably below 6,000.

An embodiment of the invention relates to an oligomer mixture, comprising the silane-oligomer. The oligomer mixture is obtainable by the reaction of (i) an oligomer polyol, (ii) a polyisocyanate, (iii) a compound providing a reactive terminus and (iv) a silane containing compound. This reaction, in general, is not 100% selective and, therefore, a mixture of reaction products can be obtained. The oligomer mixture preferably comprises at least 40 wt % of the silane-oligomer which is defined by formula 1. Preferably, the oligomer mixture comprises more than 60 wt % of the silane-oligomer.

In the reaction of preparing the silane-oligomer, any oligomer polyol (i) can be used. Preferably, the oligomer polyol is a diol. If an oligomer diol is used, preferably it has on average at least about 2 hydroxyl groups. The oligomer polyol may have, on average, more than 2 hydroxyl groups. If the oligomer polyol has more than 2 hydroxyl groups, the silane oligomer preferably has at least one silane group and at least one reactive terminus, whereas the excess of hydroxyl groups can be left without any other functionality or can be provided with a reactive terminus, a silane compound or mixture thereof. Examples of the oligomer diol include polyether diols, polyolefin diols, polyester diols, polycarbonate diols, and mixtures thereof. Polyether and polyolefin diols, or combinations thereof, are preferred. If a polyether diol is used, preferably the polyether is a substantially non-crystalline polyether. Preferably, the polyether comprises repeating units of one or more of the following monomer groups:

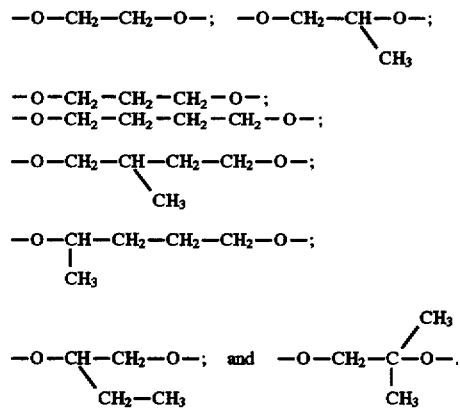

Hence, the polyether is made from epoxy-ethane, epoxypropane, tetrahydrofuran, methyl-substituted tetrahydrofuran, epoxybutane, and the like.

An example of a polyether that can be used is the polymerization product of 20 percent by weight of 3-methyltetrahydrofuran and 80 percent by weight of tetrahydrofuran, both of which have undergone a ring opening polymerization. This polyether copolymer contains both branched and non-branched oxyalkylene repeating units and is marketed as PTG-L 1000 (Hodogaya Chemical Company of Japan). Another example of a polyether that can be used is PTG-L 2000 (Hodogaya Chemical Company).

If a polyolefin diol is used, the polyolefin is preferably a linear or branched hydrocarbon containing a plurality of hydroxyl end groups. The hydrocarbon provides a hydrocarbon backbone for the silane-oligomer. Preferably, the hydrocarbon is a non-aromatic compound containing a majority of methylene groups (—$CH_2$—) and which can contain internal unsaturation and/or pendent unsaturation. Fully saturated, for example, hydrogenated hydrocarbons, are preferred because the long term stability of the cured optical fiber coating increases as the degree of unsaturation decreases. Examples of hydrocarbon diols include, for example, hydroxyl-terminated, fully or partially hydrogenated 1,2-polybutadiene; 1,4- 1,2-polybutadiene copolymers, 1,2-polybutadiene-ethylene or -propylene copolymers, polyisobutylene polyol; mixtures thereof, and the like. Preferably, the hydrocarbon diol is a substantially, fully hydrogenated 1,2-polybutadiene or 1,2-polybutadiene-ethene copolymer.

Examples of polycarbonate diols are those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described polycarbonate diols can be used. Alkylene oxide monomers include, for example, ethylene oxide, tetrahydrofuran, and the like. These copolymers produce cured coatings that exhibit a lower modulus and also inhibit crystallinity of the liquid coating composition compared to polycarbonate diol homopolymers. Admixtures of the polycarbonate diols and polycarbonate copolymers can also be utilized.

Polycarbonate diols include, for example, Duracarb 122 (PPG Industries) and Permanol KM10-1733 (Permuthane, Inc., Mass.). Duracarb 122 is produced by the alcoholysis of diethylcarbonate with hexane diol.

Examples of polyester diols include the reaction products of saturated polycarboxylic acids, or their anhydrides, and diols. Saturated polycarboxylic acids and anhydrides include, for example, phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid, the like, anhydrides thereof and mixtures thereof. Diols include, for example, 1,4-butanediol, 1,8-octane diol, diethylene glycol, 1,6-hexane diol, dimethylol cyclohexane, and the like. Included in this classification are the polycaprolactones, commercially available from Union Carbide under the trade designation Tone Polylol series of products, for example, Tone 0200, 0221, 0301, 0310, 2201, and 2221. Tone Polyol 0301 and 0310 are trifunctional.

Any organic polyisocyanate (ii), alone or in admixture, can be used as the polyisocyanate. Examples of diisocyanates include isophorone diisocyanate (IPDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. Preferably, the isocyanates are TDI and IPDI.

The compound providing a reactive terminus (iii) contains a functional group which can polymerize under the influence of actinic radiation, and the compound contains a functional group which can react with the coupling group or can form the coupling group. The group that can react with or that can form the coupling group can be, for example, hydroxy, carboxy, thiol, isocyanate, epoxy or the like. The group that can react with or that can form the coupling group is preferably a hydroxy monomer. Hydroxy functional ethylenically unsaturated monomers are preferred. More preferably, the hydroxy functional ethylenically unsaturated monomer contains acrylate, (meth)acrylate, vinyl ether, maleate or fumarate functionality.

Monomers having (meth)acrylate functional groups include, for example, hydroxy functional acrylates such as 2-hydroxyethyl acrylate, 2-hydroxypropyl acrylate, and the like. Monomers having vinyl ether functional groups include, for example, 4-hydroxybutyl vinyl ether, and triethylene glycol monovinyl ether. Monomers having maleate functional groups include, for example, maleic acid and hydroxy functional maleates.

Compounds providing a reactive terminus with epoxy functionality are for example epichlorohydrine that can be reacted with an hydroxy group of the oligomer diol, or compounds having one or more epoxy groups and a hydroxy group that can be reacted with a polyisocyanate, for example, oligomers of bisphenol-A bis epoxy resins.

Compounds providing a reactive terminus for amine-ene or thiol-ene systems can contain, for example, an allylic unsaturation, or tertiary amine or thiol groups. Thus, the silane oligomer can be provided with allylic unsaturation by reaction of an isocyanate with trimethylolpropanediallylether, or the oligomer can be provided with an amine functional group by reaction of the isocyanate with amine functional compounds. Such diluents include, for example: the adduct of trimethylolpropane, isophorondiisocyanate and di(m)ethylethanolamine, the adduct of hexanediol, isophorondiisocyanate and dipropylethanol amine, and the adduct of diethylethanolamine, dimethylethanolamine or dipropylethanolamiane. Preferably, the reactive termination of the silane oligomer has an allylic unsaturation.

The silane compound (iv) contains a silane having hydrolyzable groups and at least one group which is a non-hydrolyzable group having a functionality that can react with the coupling group, or that can form the coupling group. The functional group can be, for example, isocyanate, amine, epoxy, thiol, and the like. An isocyanate, thiol or amine group is preferred.

The preparation of the silane-oligomer is preferably executed in the following reaction sequence:
(a) a hydroxy functional ethylenically unsaturated monomer is reacted with the polyisocyanate; (b) the reaction product of (a) is reacted with the oligomer-diol; and (c) the reaction product of (b) is reacted with the silane-isocyanate. Step (c) can also comprise a reaction of the product (b) with a diisocyanate, and a further reaction with, for example, an amino-silane.

Preferably, in the reaction between the hydroxy functional ethylenically unsaturated monomer and polyisocyanate (a), a stoichiometric balance between hydroxy functionality and the polyisocyanate is used and the reactants are maintained at a reaction temperature of about 25° C. In this instance, the hydroxy functionality should be substantially consumed. Preferably, the molar ratio of the isocyanate groups to the hydroxy groups of the ethylenically unsaturated monomer is in the range of about 3:1 to about 1.2:1, and more preferably about 2:1. The hydroxy functional ethylenically unsaturated monomer attaches to the isocyanate via a urethane linkage.

The reaction product of the isocyanate and the ethylenically unsaturated monomer is reacted with the oligomer diol, in a molar ratio which, for example, is between about 0.8 to about 1.2. Preferably, the molar ratio is about 1. Thereby, a product is obtained which is end-capped with the reaction product from the isocyanate/ethylenically unsaturated monomer reaction on at least one end of the molecule. "End-capped" means that a functional group caps one of the two ends of the oligomer diol.

The isocyanate/hydroxy functional monomer reaction product attaches to the oligomer diol via a urethane linkage.

The urethane reactions can take place in the presence of a catalyst. Catalysts for the urethane reaction include, for example, diazabicyclooctane crystals and the like.

In one embodiment of the invention, unreacted isocyanate groups can be present in the reaction product of reaction (b). However, the amount of unreacted isocyanate groups is preferably minimized to less than about 0.1 percent by weight to provide an oligomer which contains substantially no free isocyanate groups. More preferably, there is no detectable isocyanate present in the oligomer. In such an embodiment, the reaction product of step (b), the end-capped oligomer, is subsequently reacted with a silane-isocyanate (step c). The molar ratio of the silane isocyanate to the end-capped oligomer is, for example, between about 1.5 and about 0.8. Preferably the molar ratio is about 1. The silane isocyanate can be, for example, γ-isocyanatopropyl-triethoxy-silane, or a reaction product of a diisocyanate with an equimolar amount of amino- or mercapto-silane.

In another embodiment of the invention, the reaction product of step (b) can have a substantial amount of isocyanate, because further diisocyanate is added. For example, the product of step (b) can be an isocyanate functional oligomer. With such an isocyanate functional oligomer, an aminosilane can be added to provide the silane oligomer.

The invention further relates to coating compositions comprising an effective amount of the silane-oligomer.

The coating composition can be prepared by combining the silane-oligomer with monomers, along with other components to form radiation curable compositions. Compositions suitable for electron-beam curing do not require a photoinitiator.

The silane oligomer preferably is combined with one or more reactive oligomers and reactive diluents, and a photoinitiator to form a radiation curable coating composition which is suitable for coating optical glass fibers.

Other components that can be present in the composition include, but are not limited to, light sensitive and light absorbing components, catalysts, initiators, lubricants, wetting agents, organofunctional silanes, antioxidants, and stabilizers.

The coating composition preferably comprises: (A) about 5 to about 99% by weight of the silane-oligomer (A); optionally (B) 0–80% by weight of other oligomers; and at least about 1 wt. % of (C) one or more reactive diluents which are each terminated with at least one end group capable of reacting with the reactive terminus of (A).

The reactive diluent (C) is preferably a combination of different reactive dilutents, although only one diluent can be used.

Preferably, if a reactive diluent (C) is used, that contains only one end group capable of reacting with the reactive terminus of (A), it will be present in an amount of more than about 5 wt. %, preferably, in an amount of less than about 60 wt. %, more preferably less than 45 wt. %. Such a monofunctional reactive diluent (C) can be, for example, a mixture of diluents as explained below.

Preferably, if reactive diluent (C) contains more than one end group capable of reacting with the reactive terminus of (A), it will be present in an amount of more than about 5 wt. %, preferably, in an amount of less than about 35 wt. %, more preferably less than 25 wt. %. Reactive diluent (C) can be, for example, a mixture of multifunctional diluents.

The reactive diluents can have one or more terminal groups capable of reacting with the reactive terminus of (A) and, in general, are used in the coating compositions to lower the viscosity and/or to provide required properties, such as hardness and refractive index. Reactive diluents preferably have a molecular weight of less than about 550 or a viscosity at room temperature of less than about 300 mPas.s (measured as 100% diluent).

Preferably, reactive diluent (C) comprises a monomer or monomers having an acrylate or vinyl ether functionality and an $C_4$–$C_{20}$ alkyl or polyether moiety. Examples of such reactive diluents are hexylacrylate, 2-ethylhexylacrylate, isobornylacrylate, decylacrylate, laurylacrylate, stearylacrylate, ethoxyethoxy-ethylacrylate, laurylvinylether, 2-ethylhexylvinyl ether, N-vinyl formamide, isodecyl acrylate, isooctyl acrylate, vinylcaprolactam, N-vinylpyrrolidone and the like. This type of reactive diluent preferably is present in an amount between about 1 and about 35 wt. %.

Another preferred type of reactive diluent (C) is a compound comprising an aromatic group. With the aid of a compound having an aromatic moiety, the refractive index of the coating composition can be adjusted to a value above 1.48, which is advantageous if the coating is used as an optical fiber coating. Examples of diluents having an aromatic group include: ethyleneglycolphenyletheracrylate, polyethylene-glycolphenyletheracrylate, polypropyleneglycolphenylether-acrylate, and alkyl-substituted phenyl derivatives of the above monomers, such as polyethylene-glycolnonylphenyletheracrylate. This type of reactive diluent preferably is present in an amount between about 1 and about 35 wt. %.

Furthermore, reactive diluent (C) preferably comprises a diluent having two groups capable of polymerization using actinic radiation. A diluent having three or more of such reactive groups can be present as well. Examples of such monomers include $C_2$–$C_{18}$ hydrocarbondioldiacrylates, $C_4$–$C_{18}$ hydrocarbondivinylethers, $C_3$–$C_{18}$ hydrocarbon triacrylates, the polyether analogues thereof, and the like, such as 1,6-hexanedioldiacrylate, trimethylolpropanetriacrylate, hexanedioldivinylether, triethyleneglycoldiacrylate, pentaerythritoltriacrylate, ethoxylated bisphenol-A diacrylate, and tripropyleneglycol diacrylate.

If the reactive terminus of the silane oligomer is an epoxy group, for example, one or more of the following compounds can be used as the reactive diluent: epoxycyclohexane, phenylepoxyethane,1,2-epoxy-4-vinylcyclohexane, glycidylacrylate, 1,2-epoxy-4-epoxyethyl-cyclohexane, the diglycidylether of polyethylene-glycol, the diglycidylether of bisphenol-A, and the like.

If the reactive terminus of the silane oligomer is an amine-ene or thiol-ene systems, examples of reactive diluents having allylic unsaturation that can be used include: diallylphthalate, triallyltrimellitate, triallylcyanurate, triallylisocyanurate and diallylisophthalate. For the amine-ene systems, amine functional diluents that can be used include, for example: the adduct of trimethylolpropane, isophorondiisocyanate and di(m)ethylethanolamine, the adduct of hexanediol, isophorondiisocyanate and dipropylethanolamine and the adduct of trimethylolpropane, trimethylhexamethylenediisocyanate and di(m)ethylethanolamine".

Besides the silane oligomer (A), other oligomers can be present. These other oligomers can be, for example, difunctional acrylate-urethane oligomers, preferably based on polyether or polyolefin oligomer diols. The mixture of (A) and (B) can be made in situ.

Oligomer (B) can be, for example, an oligomer as described in U.S. Pat. Nos. 4,849,462 or 5,146,531, or published European Patent Application Nos. 200,366 or 539,030, which are incorporated herein by reference.

Allyl and epoxy functional oligomers are well known in the art and can be used. Examples of these oligomers include poly(diallylphthalate), unsaturated polyesters, allyl terminated unsaturated polyesters, allyl terminated polyurethanes, epoxyfunctional resol resins, higher oligomers of bisphenol-A based epoxy resins, and the like.

Preferably, the coating composition comprises more than about 5, and more preferably, more than 15 wt. % of silane oligomer (A).

Advantageously, the composition can further comprise: (D) 0.1–10% by weight of one or more photoinitiators.

The photoinitiator is useful for an ultraviolet radiation-cure. In other embodiments, for example, when using an electron beam cure of a free radical system, the photoinitiator can be omitted. In cationally cured systems, however, a photoinitiator is useful even when performing an electron beam cure.

The photoinitiator, when used in an effective amount to promote radiation cure, preferably provides reasonable cure speed without causing premature gelling of the composition. The cure speed desired will depend on the application of the coating and a skilled artisan will easily be able to adjust the amount and type of photoinitiator to obtain the desired cure speed. The type of photoinitiator which is used will be dependent on whether a free radical-type system or a cationic cure type-system is used.

Examples of free radical-type photoinitiators include, but are not limited to, the following: hydroxycyclohexylphenyl ketone; hydroxymethylphenylpropanone; dimethoxyphenylacetophenone; 2-methyl-1-[4-(methyl thio)-phenyl]-2-morpholinopropanone-1; 1-(4-isopropylphenyl)-2-hydroxy-2-methylpropan-1-one; 1-(4-dodecyl-phenyl)-2-hydroxy-2-methylpropan-1-one; 4-(2-hydroxyethoxy)phenyl-2(2-hydroxy-2-propyl)-ketone; diethoxyphenyl acetophenone; 2,4,6 trimethylbenzoyl diphenylphosphone, a mixture of (2,6-dimethoxy benzoyl)-2,4,4 trimethylpentylphosphineoxide and 2-hydroxy-2-methyl-1-phenyl-propan-1-one, and mixtures of these.

Examples of cationic cure-type photoinitiators include, but are not limited to, onium salts such as iodonium, sulfonium, arsonium, azonium, bromonium, or selenonium. The onium salts are preferably chemically modified to render them more hydrophobic, for example, by incorporating saturated hydrocarbon moieties such as alkyl or alkoxy substituents of from about 4 to about 18 carbon atoms. Preferred cationic cure initiators include (4-octyloxyphenyl) phenyl iodonium hexafluoro antimonate; (4-octyloxyphenyl) diphenyl sulfonium hexafluoro antimonate; (4-decyloxyphenyl) phenyl iodonium hexafluoro antimonate; and (4-octadecyloxyphenyl) phenyl iodonium hexafluoro antimonate.

The examples of polymeric coating compositions set forth above are intended only to be illustrative of the coating compositions that may be employed in the present invention.

The present invention contemplates a glass substrate that is coated with at least one polymeric coating composition according to the invention. Most glass substrates, such as glass bottles, are usually coated with only one polymeric coating. An optical fiber substrate, however, usually has more than one coating. When a substrate has more than one coating, the various coating compositions may be the same or different. As used herein, the word "substrate" shall mean a glass object or an optical fiber. Some examples of glass objects include, but are not limited to, bottles, light bulbs, windows, etc. In one preferred embodiment, the glass substrate is an optical fiber.

In producing a coated substrate, a liquid coating composition is applied to a substrate and subsequently cured.

Typically, the cure is affected using ultraviolet or visible radiation. However, other methods are available. For example, thermal curing, usually in the presence of an initiator, can be used. Alternatively, the coating can be cured by electron beam irradiation where no catalyst is required. More than one coating can be applied. Typically, a first coating is applied and cured followed by a second coating and so on until the desired number of coatings have been applied. Alternatively, the layers can be applied on top of each other as liquids, typically referred to as a wet-on-wet process, with one final curing step at the end.

In many applications involving optical fibers it is desirable to have an outermost layer (outer primary layer) that is tough or hard enough to protect the optical fiber and underlying coatings, including an inner primary coating. The underlying coatings and inner primary coating are typically softer in comparison to the outermost coating. Surprisingly, it was found that although the silane-oligomer contains only one reactive terminus per molecule, it still provides an inner primary coating having good strength characteristics.

In many applications involving optical fibers it is desirable to have more than one coating layer, at least one inner and one outer primary coating, which are easily removed or stripped as a unit without leaving any coating residue on the stripped glass fiber.

EXAMPLES

The following examples and comparative examples serve to illustrate the invention without limiting the invention thereto.

Example I

Synthesis of the Silane Oligomer

In a reaction vessel equipped with a stirrer and air purge, 11.15 g of isophoronediisocyanate (IPDI), 0.13 g of dibutyltin dilaurate (DBTDL) and 0.07 g of butylated hydroxytoluene (BHT) were added. Over a period 90 minutes 5.82 g of 2-hydroxyethyl-acrylate (HEA) was added. Care was taken that the reaction temperature did not exceed 40° C. The concentration of isocyanate was determined using a colorimetric titration using amine and HCl. 60 grams of a reactive diluent (laurylacrylate) was added at this time. Then 209.9 g of EB-diol HPVM 2201 (Shell) (this is an ethylene-1,2-butylene copolymer) was added to the reaction vessel and the reaction was conducted at 70° C. until the concentration of isocyanate groups as determined by colorimetric titration dropped to 0. The reaction temperature was lowered to 40° C. and 12.39 g of silane type A-1310 (OSI-specialty) γ-isocyanato-propyltriethoxy silane was added. The reaction temperature was maintained at 40° C. until the concentration of isocyanate groups dropped to about 0.1 or less.

Examples II–V

In an analogous way to Example 1, four more oligomers were prepared, based on the materials described in Table 1. In each of Examples II–V, 0.07 grams of BHT and 0.13 grams of dibutyltin dilaurate were used.

|  | Example II | Example III | Example IV | Example V |
|---|---|---|---|---|
| MATERIAL WEIGHT % | | | | |
| Isophoronediisocyanate | 38.80 | 34.70 | 37.65 | 24.53 |
| Hydroxyethylacrylate | 20.25 | 18.15 | 19.65 | 12.83 |
| Laurylacrylate | | | | 59.40 |
| Isodecylacrylate | 68 | 61.5 | 59.20 | |

-continued

| | Example II | Example III | Example IV | Example V |
|---|---|---|---|---|
| PTG-L1000 (Hodogaya Chemical Co.) Polyoxytetramethyleneglycol | 166.1 | | | |
| PPG 1025 (ARCO) Polypropyleneglycol | | 154.05 | | |
| Permanol KM101733 (Permuthane) Polycarbonate | | | 137.02 | |
| Nisso GI-1000 (Nippon Soda) Hydrogenated polybutadiene | | | | 174.56 |
| A-1310 (OSI-specialty) | 43.01 | 37.57 | 38.08 | 25.70 |

Example VI and Comparative Experiments A and B Preparation and Analysis of a Coating Composition The silane-oligomer prepared in example I was mixed with the components as shown in table 2. CGI-1700 (Ciba Geigy) is a blend of 2-hydroxy-2-methyl-1-phenyl-1-propanone and bis (2,6-dimethoxybenzoyl) (2,4,4,-trimethylpentyl)phosphineoxide. Irganox 1035 (Ciba Geigy), a stabilizer, was used in an amount of 0.5 wt %. Table 2: Compositions of example VI and comparative data A and B. Comparative Example B is a commercial coating composition which was analyzed to determine the chemical composition thereof.

TABLE 2

| | Ex. VI | Comp. A | Comp. B |
|---|---|---|---|
| Composition (weight %) | | | |
| Silane oligomer Ex. I | 75[1] | | |
| Non-silane oligomer | | 92[2] | 67[3] |
| Ethoxylated nonylphenylacrylate | 10 | | |
| Propoxylated nonylphenol acrylate | | | 12 |
| Phenoxyethylacrylate | | 4 | |
| Tripropyleneglycoldiacrylate | 12 | | |
| Laurylacrylate | | | 15 |
| Photoinitiator[4] | 2.5 | 2.9 | 6 |
| γ-mercaptopropyltrimethoxysilane | — | 1 | .2 |

[1] contains 20 wt % of laurylacrylate
[2] is an oligomer as described in Example 4 of U.S. Pat. No. 4,849,462, dissolved in 30 wt % phenoxyethylacrylate and 7 wt % N-vinylpyrrolidone
[3] is a hydrocarbon based oligomer
[4] respectively: CGI-1700 (Ciba Geigy), diethoxyacetophenone and Irganox 184 (Ciba Geigy).

The coatings were cured on a glass plate, and several characteristics were measured. The results are shown in table 3.

TABLE 3

| | Ex. VI | Comp. A | Comp. B |
|---|---|---|---|
| E' = 1000 MPa | −59° C. | −16° C. | −39° C. |
| $E_0$ MPa | 1.2 | 1.6 | 1.1 |
| Adhesion | | | |
| 50% RH | 22 | 540 | 146 |
| 95% RH | 17 | 215 | 124 |
| $H_2O$ soak extraction | 1.7% | 3.5% | 3.7% |
| $H_2O$ absorption | 0.3 | 2.7 | 0.1 |

These results demonstrate that a coating was obtained with very low water soak extraction, which coating remains soft to a very low temperature and that also has sufficient strength ($E_0$). Furthermore, the wet adhesion was only slightly lower than the adhesion at 50% RH.

Examples VII–IX

Coating compositions were prepared by combining the silane oligomer with other oligomers as shown in table 4. Some results are shown in table 4 as well.

TABLE 4

| | Ex. VII | Ex. VIII | Ex. IX |
|---|---|---|---|
| Composition (weight %) | | | |
| Silane Oligomer | 10 Ex. II | 20 Ex. II | 30 Ex. II |
| Non-silane Oligomer | 85[1] | 50[2] | 43[2] |
| Phenoxyethyl-acrylate | 2 | | |
| Polyethoxynonyl-phenolacrylate | | 25 | 23 |
| Photo-initiator | 3 | 3 | 3 |
| Properties | | | |
| E' = 1000 MPa | −17° C. | −39° C. | −42° |
| $E_0$ (Mpa) | 2.3 | 1.8 | 1.8 |
| Tensile strength (MPa) | 2.7 | 0.5 | 0.6 |
| % Elongation | 165 | 40 | 50 |
| Adhesion g-force | | | |
| 50% RH | 385 | 14 | 14 |
| 90% RH | 203 | 10 | 11 |

[1] oligomer as described in comparative experiment A
[2] A non-polyolefin polyurethane acrylate oligomer with 20% of a soft acrylate diluent.

Test Procedures

The water soak extraction and absorption were measured using the following procedure. A drawdown of each material to be tested was made at a film thickness of about 150 microns (8 mils) on a glass plate and cured. The cured film was cut to form three sample specimens, approximately 3 cm×3 cm (1½×1½), on the glass plate. The glass plate containing the three sample specimens was heated at 60° C. for one hour and then placed in a desiccator for 15 minutes.

125 ml (4 oz.) of deionized or distilled water was poured into three 125 ml (4 oz.) glass jars, maintained at a temperature of 23°±2° C. Each of the sample specimens were removed from the glass plate and weighed on an analytical balance using corrugated Teflon paper to prevent sticking. Each sample specimen was then placed into one of the jars of water.

The sample specimens were soaked in the water for 30 minutes and then removed from the glass jars. The water remaining on the surface of the sample specimens was removed by blotting them with lint free wiping tissue.

The samples were reweighed as above and placed back into their respective jars.

The above procedure was repeated at 1, 2, 3, and 24 hours, and at 7 and 14 days.

At 21 days, the sample specimens were removed from the glass jars and reweighed as above. The sample specimens were placed onto a glass plate and heated at 60° C. for one hour, and then placed in a desiccator for 15 minutes. The sample specimens were reweighed as before.

The percent weight change at each time interval for each sample specimen was determined. The values for the three sample specimens at each time interval were averaged. The water absorption reported is the largest, positive average percent weight change.

The water extraction for each sample specimen was determined by dividing the difference of the initial and 21-day dried weights by the initial dried weight and multiplying by 100. The reported value is the average of the three sample specimen values.

The total water sensitivity is the sum of the absolute values of the water absorption and the water extraction.

The elastic modulus (E'), the viscous modulus (E"), and the tan delta (E"/E') of the examples were measured using a Rheometrics Solids Analyzer (RSA-11), equipped with: 1) A personal computer having MS-DOS 5.0 operating system and having Rhios® software (Version 4.2.2 or later) loaded; 2) A liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −80° C. and increasing the temperature at about 1°/minute until the temperature reached about 60° C. to about 70° C. The test frequency used was 1.0 radian/second.

The adhesion of cured samples on a glass plate at 50% relative humidity and 95% relative humidity were tested using a universal testing instrument, Instron Model TTD. The load cell had a ten pound capacity.

Glass plates, polished, 20×20 cm, (Alletch Associates catalog number 26080) were used. The test material was applied to the glass plates and cured using a UV processor. The thickness of the cured film was about 75 microns.

The cured films were held at 50% relative humidity, at about 23° C., for seven days prior to testing. Prior to removing the plates from the environmental chamber, a layer of slurry (fine powdered polyethylene and water) was applied to the surface of the drawdown to retain the moisture.

Test specimens, approximately 1 inch in width and 5 inches long, were cut parallel to the direction in which the drawdown of the cured film was prepared. A thin layer of talc was applied to the first and third strips on each drawdown to reduce blocking during the adhesion test.

The instrument was calibrated prior to testing. The crosshead speed was set to 10.00 inch/min. For each material, the force required to remove four test specimens from the glass plate was measured and recorded on a strip chart recorder. The value reported is the average of the four measured values.

The test specimens remaining on the glass plate were then held at 95% relative humidity, at about 23° C., in an environmental chamber for 1 more day. Prior to removing the plates from the environmental chamber, a layer of slurry (fine powdered polyethylene and water) was applied to the surface of the drawdown to retain the moisture. For each material, the force to remove four test specimens from the glass plate was measured as above.

The tensile strength of cured samples was tested using a universal testing instrument, Instron Model 4201 equipped with a personal computer and software "Series IX Materials Testing System." The load cells used were 2 and 20 pound capacity. The ASTM D638M was followed, with the following modifications.

A drawdown of each material to be tested was made on a glass plate and cured using a UV processor. The cured film was conditioned at 23°±2° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The appropriate load cell was determined by using the following equation:

$$[A \times 145] \times 0.0015 = C$$

Where: A=Product's maximum expected tensile strength (MPa); 145=Conversion Factor from MPa to psi; 0.00015= approximate cross-sectional area (in$^2$) of test specimens; and C=lbs. The 2 pound load cell was used for materials where C=1.8 lbs. The 20 pound load cell was used for materials where 1.8<C<18 lbs. If C>19, a higher capacity load cell was required.

The crosshead speed was set to 1.00 inch/min, and the crosshead action was set to "return at break". The crosshead was adjusted to 2.00 inches jaw separation. The air pressure for the pneumatic grips was turned on and adjusted as follows: set approximately 20 psi(1.5 Kg/cm$^2$) for primary optical fiber coatings and other very soft coatings; set approximately 40 psi(3Kg/cm$^2$) for optical fiber single coats; and set approximately 60 psi(4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were only analyzed if the temperature was within the range 23°±1.0° C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and (secant or segment) modulus were checked to determine whether any one of them deviated from the average enough to be an "outlier." If the modulus value was an outlier, it was discarded. If there were less than six data values for the tensile strength, then the entire data set was discarded and repeated using a new plate.

While the invention has been described in detail and with reference to specific embodiments thereof, it will be apparent to one of ordinary skill in the art that various changes and modifications can be made therein without departing from the spirit and scope thereof.

What is claimed is:

1. A radiation-curable, optical glass coating composition formulated from:

(A) 5–99% by weight of a silane-oligomer of the following formula:

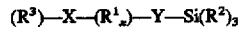
   $$(R^3)—X—(R^1_x)—Y—Si(R^2)_3 \quad (1)$$

wherein
   $R^1_x$ is a backbone containing carbon having a molecular weight of more than about 400 and less than about 10,000 and $R^1_x$ is selected from the group consisting of polyolefins, polyethers, polyesters, polycarbonates, and mixtures thereof,
   $R^2$ are hydrolyzable groups,
   $R^3$ is a group having an actinic-radiation-induced polymerizable functionality, and
   X and Y are coupling groups containing urethane, urea, or thiourethane linkages,
   said silane-oligomer being substantially free of isocyanate groups; and (B) at least 1 wt. % of one or more reactive diluents which are each terminated with at least one end group that can react with said actinic-radiation-induced polymerizable functionality of said $R^3$ group, said % by weight based on the total weight of said glass coating composition.

2. The glass coating composition according to claim 11, wherein said component (B) is present in an amount of from about 1 to about 60% by weight when component (B) comprises a reactive diluent which is terminated with only one end group that can react with said actinic-radiation-induced polymerizable functionality of said $R^3$ group component, and said component (B) is present in an amount of from about 1 to about 35% by weight when component (B) comprises a reactive diluent which is terminated with at least two end groups that can react with said actinic-radiation-induced polymerizable functionality of said $R^3$ group.

3. The glass coating composition according to claim 1, wherein said coating composition is the reaction product of a polyisocyanate, a compound having a reactive group $R^3$, an oligomer polyol, and a silane compound.

4. A glass coating composition according to claim 1, wherein said coating composition comprises more than about 15% by weight of said silane-oligomer.

5. The glass coating composition according to claim 1, wherein said silane-oligomer has a non-aromatic polyolefin backbone wherein at least a major portion of the molecular structure of the backbone is composed of methylene groups ($—CH_2—$).

6. A radiation-curable glass coating composition according to claim 1, wherein said backbone is a polyolefin.

7. A radiation-curable optical glass fiber coating composition which when coated on optical glass fibers and suitably cured exhibits the combination of properties of adhesion to the glass optical fibers, stripability from the glass optical fibers, enhanced water resistance, and a low water soak, said coating composition in uncured form being formulated from:

a silane-oligomer of the following formula:

   $$(R^3)—X—(R^1_x)—Y—Si(R^2)_3$$

wherein
   $R^1_x$ is a backbone containing carbon having a molecular weight of at least about 400 and less than about 10,000 and $R^1_x$ is selected from the group consisting of polyolefins, polyethers, polyesters, polycarbonates, and mixtures thereof,
   $R^2$ are hydrolyzable groups,
   $R^3$ is a group having an actinic-radiation-induced polymerizable functionality, and
   X and Y are coupling groups containing a urethane, thiourethane, or urea linking group,
   said silane-oligomer being substantially free of isocyanate groups; and
   a reactive diluent carrying an end group that can react with said actinic-radiation-induced polymerizable functionality of said $R^3$ group.

8. A radiation-curable optical glass fiber coating composition according to claim 7, wherein $R^1_x$ has a molecular weight more than about 400 and less than about 5,000.

9. A radiation-curable optical glass fiber coating composition according to claim 7, wherein said backbone is non-polar to provide a lower water absorption of said cured composition.

10. A radiation-curable optical glass fiber coating composition according to claim 7, wherein said backbone is selected from the group consisting of a polyether, a polyolefin, and a copolymer thereof.

11. A radiation-curable optical glass fiber coating composition according to claim 7, wherein the hydrolyzable groups $R^2$ are independently selected from the group consisting of alkoxy, carboxy and alkoxy-ether groups.

12. A radiation-curable optical glass fiber coating composition according to claim 11, wherein $R^2$ has less than 8 carbon atoms.

13. A radiation-curable optical glass fiber coating composition according to claim 7, wherein the molecular weight of said silane-oligomer is greater than about 500 and lower than about 11,000.

14. A radiation-curable optical glass fiber coating composition according to claim 7, wherein the molecular weight of said silane-oligomer is greater than about 500 and lower than about 6,000.

15. A radiation-curable optical glass fiber coating composition according to claim 7, wherein said reactive diluent is present in an amount of about 5 to about 60% by weight.

16. A radiation-curable optical glass fiber coating composition according to claim 7, wherein said reactive diluent comprises a monomer or monomers having an acrylate or vinyl ether functionality and an $C_4$–$C_{20}$ alkyl or polyether moiety.

17. A radiation-curable optical glass fiber coating composition according to claim 7, wherein said reactive diluent comprises an aromatic group to thereby increase the refractive index of said cured coating to a value above 1.48.

18. A radiation-curable optical glass fiber coating composition according to claim 7, further comprising a photo-initiator.

19. A radiation-curable optical glass fiber coating composition according to claim 7, wherein said coating composition comprises more than about 5% by weight of said silane-oligomer.

20. A radiation-curable optical glass fiber coating composition according to claim 7, wherein said coating composition comprises more than about 15% by weight of said silane-oligomer.

21. A radiation-curable optical glass fiber coating composition according to claim 7, wherein $R^3$ has a functional group selected from the class consisting of an acrylate, a vinyl ether, methacrylate, acrylamide, and epoxy group.

22. The glass coating composition according to claim 7, wherein said silane-oligomer has a non-aromatic polyolefin backbone wherein at least a major portion of the molecular structure of the backbone is composed of methylene groups (—$CH_2$—).

23. A radiation-curable composition according to claim 7, wherein said backbone is a polyolefin.

24. A radiation-curable optical glass fiber coating composition which when coated on optical glass fibers and suitably cured exhibits the combination of properties of adhesion to the glass optical fibers, stripability from the glass optical fibers, enhanced water resistance, and a low water soak, said coating composition in uncured form being formulated from:

a silane-oligomer of the following formula:

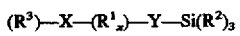

wherein $R^1_x$ is a backbone containing carbon having a molecular weight of at least about 400 and less than about 10,000, and $R^1_x$ selected from the group consisting of polyolefins, polyethers, polyesters, polycarbonates, and mixtures thereof $R^2$ are hydrolyzable groups each independently selected from the group consisting of alkoxy, carboxy and alkoxy-ether groups, $R^3$ is a group having an actinic-radiation-induced polymerizable functionality, and X and Y are each independently selected from the group consisting of coupling groups containing a urethane, urea, or thio-urethane linking group, said silane-oligomer being substantially free of isocyanate groups and said silane-oligomer having a molecular weight greater than about 500 and lower than about 11,000; and a reactive diluent carrying an end group that can react with said actinic-radiation-induced polymerizable functionality of said $R^3$ group.

25. A radiation-curable composition according to claim 24, wherein said backbone is a polyolefin.

* * * * *